US008192323B2

(12) United States Patent
Fox

(10) Patent No.: US 8,192,323 B2
(45) Date of Patent: Jun. 5, 2012

(54) EPICYCLIC GEAR SYSTEM WITH FLEXPINS

(75) Inventor: Gerald P. Fox, Massillon, OH (US)

(73) Assignee: The Timken Company, Canton, OH (US)

( * ) Notice: Subject to any disclaimer, the term of this patent is extended or adjusted under 35 U.S.C. 154(b) by 1165 days.

(21) Appl. No.: 11/997,059

(22) PCT Filed: Jul. 27, 2006

(86) PCT No.: PCT/US2006/029395
§ 371 (c)(1),
(2), (4) Date: Jan. 28, 2008

(87) PCT Pub. No.: WO2007/016336
PCT Pub. Date: Feb. 8, 2007

(65) Prior Publication Data
US 2008/0194378 A1    Aug. 14, 2008

Related U.S. Application Data

(60) Provisional application No. 60/704,329, filed on Aug. 1, 2005.

(51) Int. Cl.
*F16H 57/08* (2006.01)

(52) U.S. Cl. .......................................... 475/347; 290/55

(58) Field of Classification Search ................... 475/331, 475/346, 347, 348, 339, 149, 150; 290/40 C, 290/44, 55; 464/51, 71
See application file for complete search history.

(56) References Cited

U.S. PATENT DOCUMENTS

| | | | |
|---|---|---|---|
| 2,560,513 A * | 7/1951 | Lyon | ................................. 5/9.1 |
| 3,303,713 A | 2/1967 | Hicks | |
| 3,943,787 A | 3/1976 | Hicks | |
| 3,964,334 A * | 6/1976 | Hicks | ............................ 475/347 |
| 3,983,764 A | 10/1976 | Hicks | |

(Continued)

FOREIGN PATENT DOCUMENTS

FR       2166690        8/1973

(Continued)

OTHER PUBLICATIONS

International Search Report; Written Opinion (PCT/US2006/029395 filed Jul. 27, 2006).

*Primary Examiner* — David D Le
*Assistant Examiner* — Huan Le
(74) *Attorney, Agent, or Firm* — Polster, Lieder, Woodruff & Lucchesi, L.C.

(57) ABSTRACT

An epicyclic gear system (A) includes a sun gear (2), a ring gear (4) located around the sun gear, planet gears (6) organized in two arrays between the sun and ring gears, and a carrier (8) having walls (14) located beyond the planet gears and flexpins (24) that project from the walls into the planet gears. Each flexpin includes an inner pin (30) provided with a flange 36 that is secured to the wall from which the inner pin projects, thus cantilevering the inner pin from the wall, and a sleeve (32) that is cantilevered from the opposite end of the inner pin and extends back over the inner pin, thus providing a double cantilever. Between the sleeve of the flexpin and the planet gear for that flexpin is a double row tapered roller bearing (26). The planet gears on the one array may be offset angularly with respect to the planet gears of the other array.

10 Claims, 4 Drawing Sheets

U.S. PATENT DOCUMENTS

| | | | |
|---|---|---|---|
| 5,240,462 A * | 8/1993 | Mochizuki et al. | 475/342 |
| 5,472,383 A * | 12/1995 | McKibbin | 475/159 |
| 6,117,041 A | 9/2000 | Avery | |
| 6,918,853 B2 * | 7/2005 | Tanikawa | 475/348 |
| 7,011,598 B2 * | 3/2006 | Flamang et al. | 475/331 |
| 2003/0008748 A1 | 1/2003 | Fox | |
| 2005/0075211 A1 | 4/2005 | Fox | |
| 2008/0274849 A1 * | 11/2008 | Smook et al. | 475/11 |

FOREIGN PATENT DOCUMENTS

| | | |
|---|---|---|
| JP | 57018838 | 1/1982 |
| WO | WO 2004/067998 | 8/2004 |
| WO | WO 2005/005866 | 1/2005 |
| WO | WO 2005/050058 | 6/2005 |

* cited by examiner

EPICYCLIC GEAR SYSTEM WITH FLEXPINS

RELATED APPLICATION

This application derives and claims priority from U.S. provisional application 60/704,329 filed 1 Aug. 2005, and from International Application PCT/US2006/029395 (WO 2007/016336), filed on 27 Jul. 2006, by The Timken Company, both of which are incorporated herein by reference.

TECHNICAL FIELD

This invention relates in general to gearing and more particularly to epicyclic gear systems.

BACKGROUND ART

Epicyclic gear systems, often called planetary systems, have the capacity to transmit considerable power in confined spaces. Typical of such confined spaces are the nacelles of wind turbines. In a wind turbine a rotor driven by blades that catch the wind powers an electrical generator. But the rotor revolves slowly, while the generator must turn at a considerably higher velocity if it is to remain relatively small. To this end, a transmission exists between the rotor and the generator to increase the speed. Usually the transmission contains one or more epicyclic gear sets. The transmission must have a high power density.

In its most basic form an epicyclic gear system has a sun gear and a ring gear located around the sun gear, with both centered along a common central axis. Planet gears located between the sun and ring gears engage both and rotate about pins that establish axes that are offset from the central axis. The pins form part of a carrier that likewise shares the central axis.

The carrier may take the form of the straddle variety in which each pin extends between and is anchored in walls at both of ends of the carrier. On the other hand, the carrier may be of the flexpin variety in which each flexpin has an inner pin that extends from a carrier wall in a cantilevered manner and at its remote end is fitted with a sleeve that doubles back over the inner pin such that it is cantilevered from the remote end of the inner pin—a double cantilever so to speak. See U.S. Pat. No. 3,309,743 to R. J. Hicks.

Straddle carriers under heavy loads experience torsional wind up which causes one carrier wall to twist slightly ahead of the other carrier wall, thus skewing the pins and changing a mesh between the planet gears and the sun and ring gears. This leads to excessive noise, friction and wear. In a flexpin carrier, the inner pin of each flexpin skews in one direction, while the sleeve skews in the opposite direction to negate the skew of the inner pin. While this mitigates the skewing problem, the inner pins are heavily stressed where they are cantilevered from the carrier wall.

BEST MODE OF CARRYING OUT THE INVENTION

Figure 1:
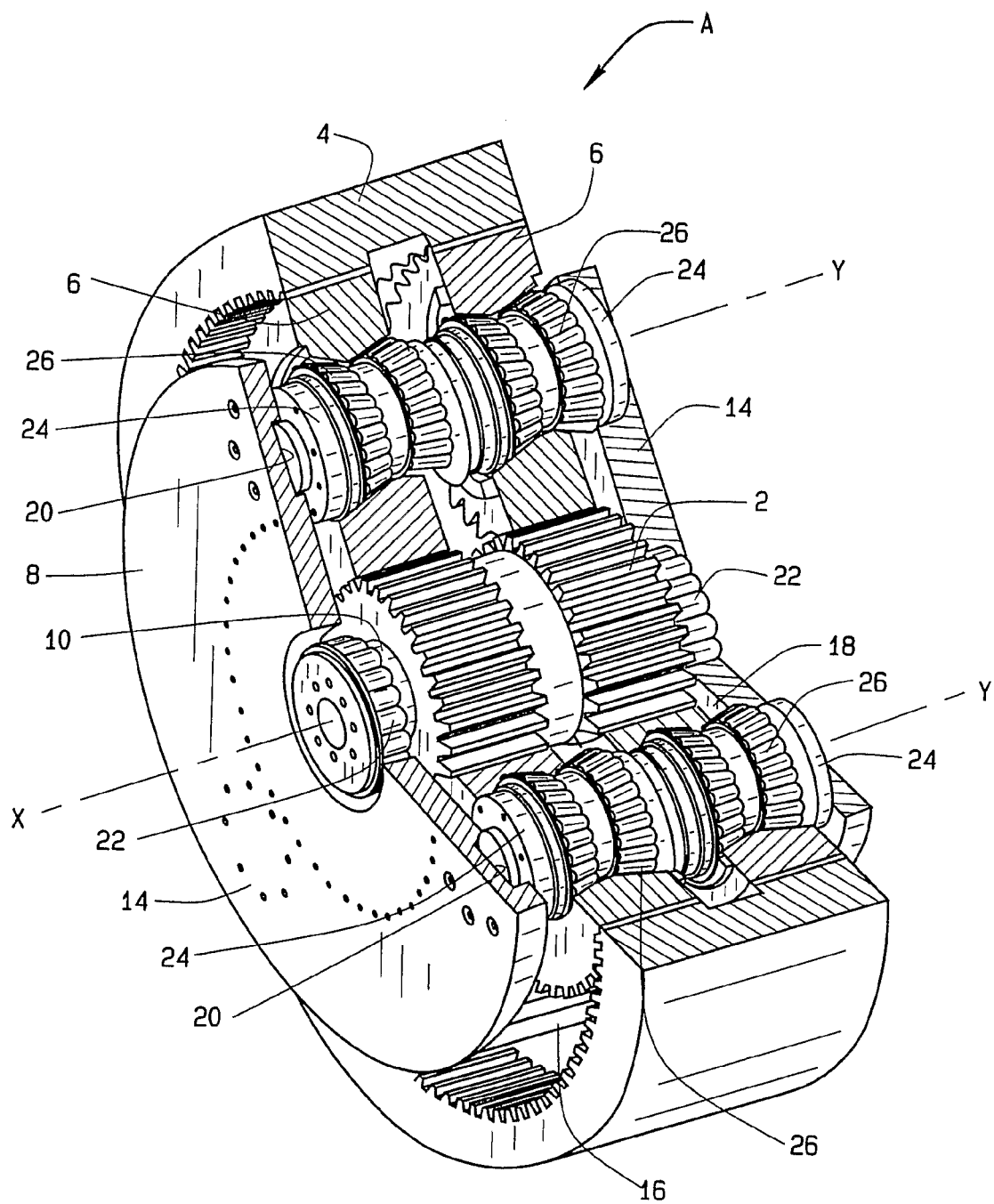
FIG. 1 is a perspective view, partially broken away and in section, of an epicyclic gear system constructed in accordance with and embodying the present invention.
Figure 2:
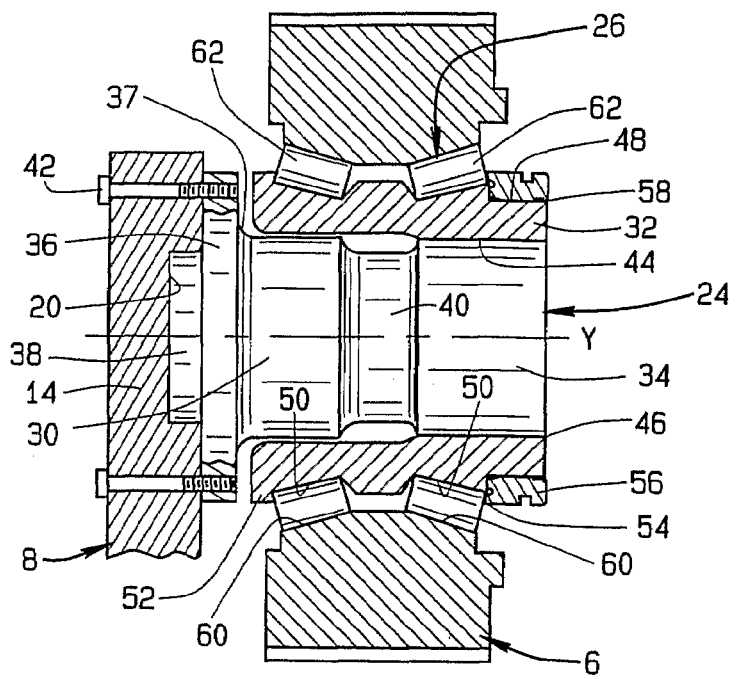
FIG. 2 is a sectional view of one of the planet gears and the flexpin about which it revolves.
Figure 3:
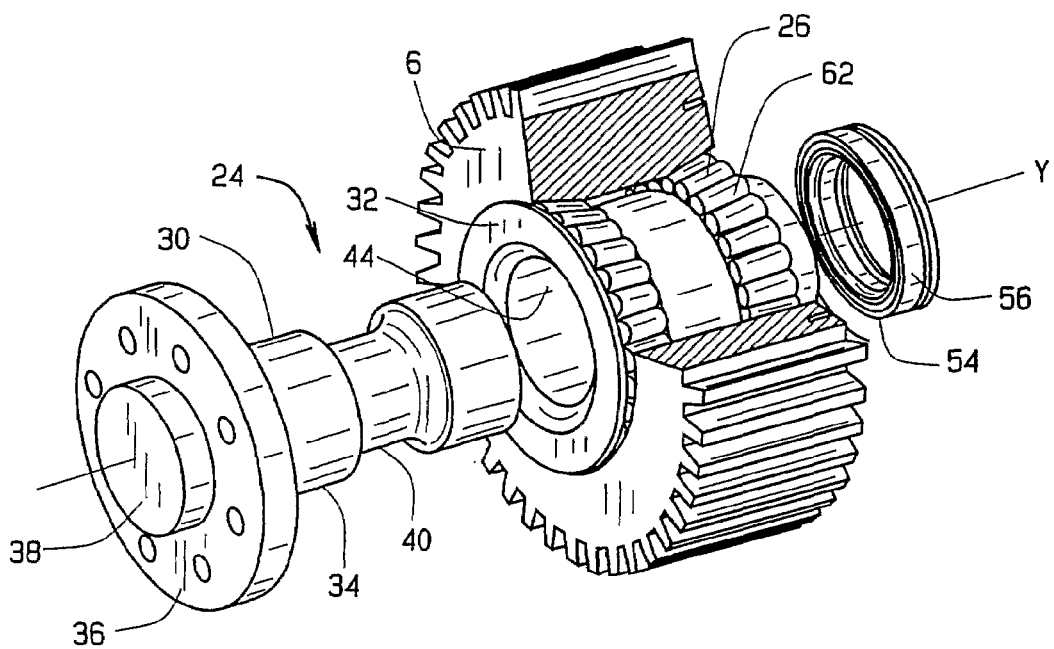
FIG. 3 is an exploded perspective view, partially broken away and in section, of a planet gear and its flexpin.

Referring now to the drawings, a epicyclic gear system A (FIG. 1) which is organized about a central axis X, includes a sun gear 2, a ring gear 4 surrounding the sun gear 2, planet gears 6 arranged in two arrays between the sun gear and ring gears 2 and 4 and engaged with both, and a carrier 8 on which the planet gears 6 revolve. The sun gear 2, the ring gear 4, and the carrier 8 share the central axis X, and if any one of them rotates, it rotates about the axis X. The planet gears 8 rotate about axes Y that are offset from the axis X, yet are generally parallel to the axis X.

The sun gear 2 has external teeth that may extend entirely across the gear 2 or they may be arranged in two rows, one for each of the arrays of planet gears 6. At its ends the sun gear 2 has spindles 10 that project axially into the carrier 8. The ring gear 4 has internal teeth that likewise may extend entirely across the gear or may be arranged in two rows. The planet gears 6 have external teeth that engage the teeth on the sun and ring gears 2 and 4.

The carrier 8 includes end walls 14 that lie parallel to each other at the ends of the epicyclic system A and bridges 16 that span the space between the walls 14 and rigidly join the two walls 14 together. Even so, at least one wall 14 can be detached from the bridges 16 and removed to facilitate assembly of the gear system A. The bridges 16 divide the space between the two walls 14 into pockets 18, and the pockets 18 accommodate the planet gears 6. At each pocket 18, each of the walls 14 has a socket 20 that opens into the pocket 18. The walls 14 of the carrier 8 have antifriction bearings 22 that receive the spindles 10 of the sun gear 2, thus accommodating relative rotation between the sun gear 2 and the carrier 8 and insuring that the two remain truly concentric. In addition, the carrier 8 has flexpins 24 that project from the walls 14 into the planet gears 6 in the pockets 18. Finally, the carrier 8 has antifriction bearings 26 interposed between the flexpins 24 and the planet gears 6, so that each planet gear 6 rotates about its flexpin 24 on a separate bearing 26.

Each flexpin 24 includes an inner pin 30 that is cantilevered from one of the carrier walls 14 and a sleeve 32 that surrounds the inner pin 30 and is cantilevered from the inner pin 30 remote from the wall 14 on which the pin 30 is anchored—a double cantilever. To this end, the inner pin 30 has a shank 34 and an integrally formed flange 36 at one end of the shank 34. The shank 34 merges into the flange 36 at a fillet 37 having a suitable radius specified to control notch sensitivity in the region of the cantilevered pin 30 where bending moments are greatest. The inner pin 30 also has a cylindrical boss 38 that projects from the flange 36 and away from the shank 34, it having a diameter slightly greater than the diameters of the sockets 20 in the carrier walls 14. The shank 34 contains a groove 40 that provides a reduced diameter intermediate the ends of the shank 34—and greater flexibility in that region as well. More fillets lie at the base of the groove 40 to eliminate abrupt transitions into the enlarged regions beyond the ends of the groove 40. The cylindrical boss 38 of the inner pin 30 fits into one of the sockets 20 in the wall 14 from which the flexpin 24 projects, there being a slight interference fit between the boss 38 and the socket 20. The pin flange 36 bears against the inside face of the carrier wall 14, and the two are joined firmly together with machine screws 42 that pass through the carrier wall 14 and thread into the pin flange 36.

The sleeve 32 has a through bore 44, the diameter of which is smaller at the end remote from the carrier wall 14 than at the remainder of the bore 44. Indeed, the diameter of the bore 44 at the remote end is such that an interference fit exists between the sleeve 32 and the region of shank 34 beyond the groove 40. However, the diameter of the remainder of the bore 44 is such that a clearance exists between the sleeve 32 and the inner pin 30 at the groove 40 in the shank 34, at the region between the groove 40 and the fillet 37, and at the fillet 37 as well. Moreover, the sleeve 32 terminates short of the flange 36, so that a space exists between the end of the sleeve 32 and the flange 36. These clearances enable the sleeve 32 to deflect with respect to the inner pin 30, so that the two assume opposite inclinations. The opposite end of the sleeve 36 lies flush with the end of the shank 34, and here the inner pin 30 and the sleeve 32 are joined together along a weld 46. At that end, the sleeve 32 also has a rabbit 48.

The bearings 26 lie between the planet gears 6 and the sleeves 32 on the flexpins 24. Indeed, components of the bearings 26 are formed on and integral with both. To this end, each sleeve 32 carries inboard and outboard raceways 50 that taper downwardly toward each other. The large end of the inboard raceway 50 lies along a thrust rib 52 that is formed integral with the sleeve 32. The large end of the outboard raceway 50 lies along another thrust rib 54 that projects from a rib ring 56 that fits into the rabbet 46 at the remote end of the sleeve 32. The opposite end of the rib ring 56 lies generally flush with the sleeve 32, and here the sleeve 32 and rib ring 56 are joined together along another weld 58. The bearing 26 also includes inboard and outboard outer raceways 60 carried by the planet gear 6 that surrounds the sleeve 32 of the flexpin 24 for that planet gear 6. The inboard outer raceway 60 surrounds inboard inner raceway 50 and is inclined in the same direction. The outboard outer raceway 60 surrounds the outboard inner raceway 50 and is inclined in the same direction. Finally, the bearing 26 includes tapered rollers 64 organized in two rows, one between the inboard raceways 50 and 60 and the other between the outboard raceways 50 and 60. The tapered side faces of the rollers 62 contact the raceways 50 and 60. The large end faces of the rollers 62 in the inboard row bear against the integral thrust rib 52, while the large end faces of the rollers 62 in the outboard row bear against the thrust rib 54 on the rib ring 56. Indeed, the thrust ribs 52 and 54 prevent the rollers 62 from being expelled from the annular spaces between the raceways 50 and 60. The rollers 62 are on apex, meaning that the conical envelopes in which the side faces for the rollers 62 of each row lie have their apices at a common point along the axis Y for the bearing 26 and the same holds true for the raceways 50 and 60 of that row. Moreover, the bearing 26 is set to a condition of slight preload to eliminate all internal clearances, and this is controlled by the axial position of the thrust rib 52 along the outboard inner raceway 50.

Figure 4:
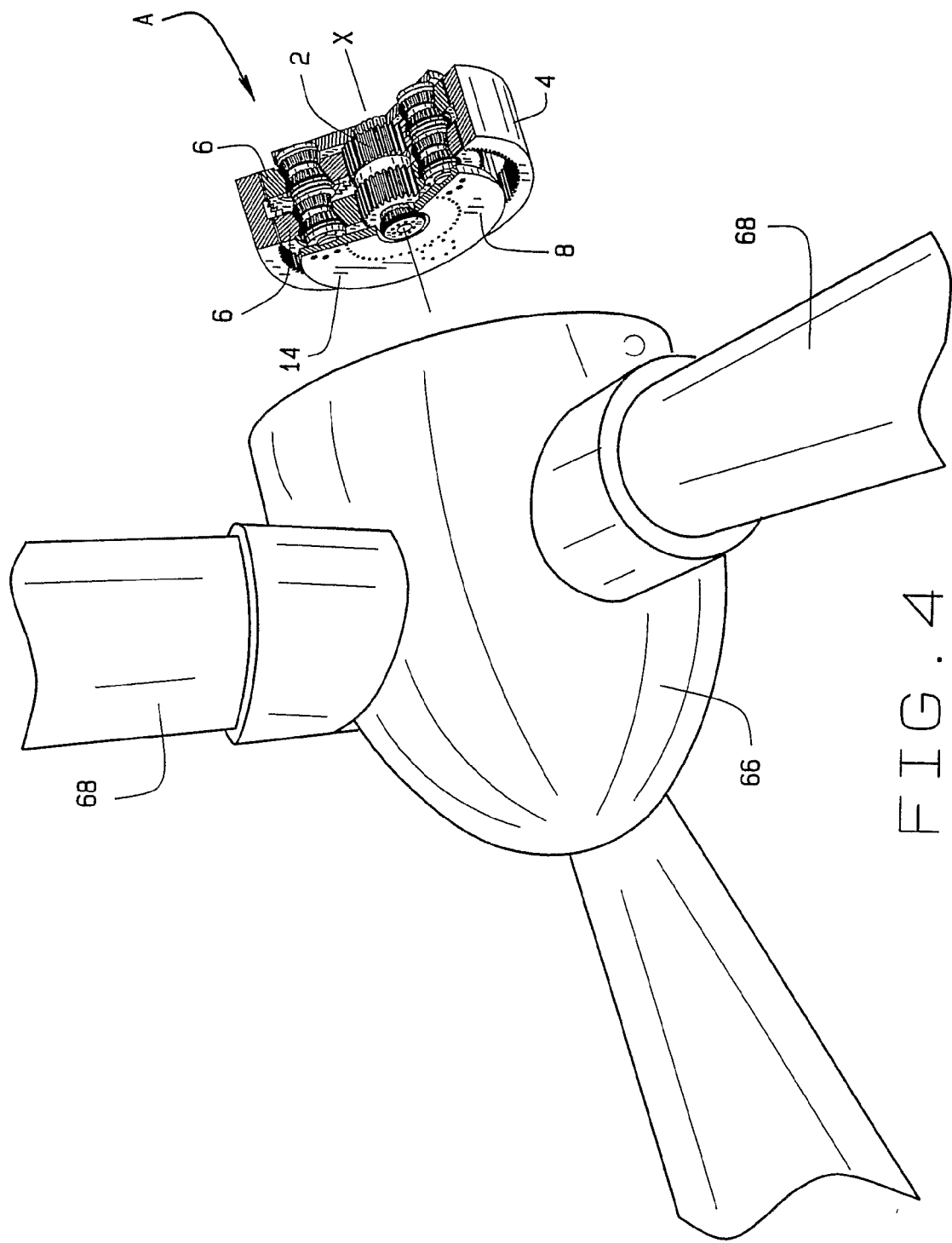
FIG. 4 is an exploded perspective view of the epicyclic gear system and a wind turbine rotor, the torque from which is transmitted through the gear system.

When the gear system A is used to effect an increase in angular velocity, the ring gear 4 is typically held stationary. Torque is applied to the carrier 8 at a relatively low angular velocity and delivered at a higher angular velocity at the sun gear 2. For example, the carrier 4 may be connected to the rotor 66 (FIG. 4) of a wind turbine. To capture the wind, the rotor 66 has vanes or blades 68 against which the wind impinges, thus exerting torque on the rotor 66 and causing it to revolve. The rotor 66 turns the carrier 8, and it causes the planet gears 6 to orbit around the sun gear 2 and within the ring gear 4. The planet gears 6 turn the sun gear 2 at a greater velocity, and the sun gear 2, perhaps through additional gearing turns an electrical generator. Owing to the increase in velocity, the generator need not occupy excessive space.

Even though the carrier 8 and planet gears 6 transmit substantial torque, the planet gears 6 remain compliant, that is to say, they engage the sun and ring gears 2 and 4 as they should or, in other words, with little or no skewing. This compliancy derives from the flexpins 24 and the double cantilever embodied in them. When the carrier 8 exerts substantial torque, the inner pin 30 of each flexpin 24 flexes under the moment imposed on it, and this displaces the remote end of the pin 30, causing it to trail or lag the flange 36 at the opposite end. However, the sleeve 32 of the flexpin 24 orients itself opposite to the direction of the flexure, so that it remains essentially parallel to the central axis X. Since the sleeve 32 establishes the axis Y of rotation for the planet gears 4, the axis Y remains essentially parallel to the central axis X. This promotes a good mesh between the planet gears 6 and the sun and ring gears 2 and 4.

Heretofore, it has been the practice to secure the inner pins of flexpins to their carrier wall with a heavy press fits and welds between the very ends of the inner pins and the carrier wall. This creates plastic deformations in the carrier wall at the site of the press fits and further imposes high stress concentrations in the inner pins where they emerge from the carrier wall. Apart from that, disassembly for repair or replacement of any flexpin and the planet gear supported on it is virtually impossible.

The epicyclic gear system A eliminates these problems. The interference fit that exists between the cylindrical boss 38 of each flexpin 24 and its socket 20 in the carrier wall 14 serves to position the flexpin 24 and its planet gear 6 on the carrier wall with precision, but the press fit is light and does not excessively stress either the carrier wall 14 on the inner pin 30. The machine screws 42 secure the inner pin 30 of each flexpin 24 firmly to its carrier wall 14, but once removed, allow for easy removal of the flexpin 24 and the planet gear 6 that it supports, so that the unit may be repaired or replaced. The generous fillet 37 where the shank 34 of the inner pin 30 merges into the flange 36 of the inner pin 30 eliminates high stress concentrations in the region of the heaviest moments.

The flexpins 24 that project from the one carrier wall 14 may align with the flexpins 24 that project from the other carrier wall 14, so that the flexpins 24 and the planet gears 6 that they carry are organized in aligned pairs. As a consequence, the planet gears 6 of each pair simultaneously engage the same teeth on the sun and ring gears 2 and 4, assuming that the teeth extend fully across the gears 2 and 4. To avoid overstressing those teeth and the bending that occurs with such overstressing, the flexpins 24 on the one carrier wall 14 may be offset angularly from the flexpins 24 on the other carrier wall 14. The offset need only be enough to enable the planet gears 6 in the one array to engage the sun and ring gears 2 and 4 one or two teeth ahead or behind their counterparts in the other array.

Figure 5:
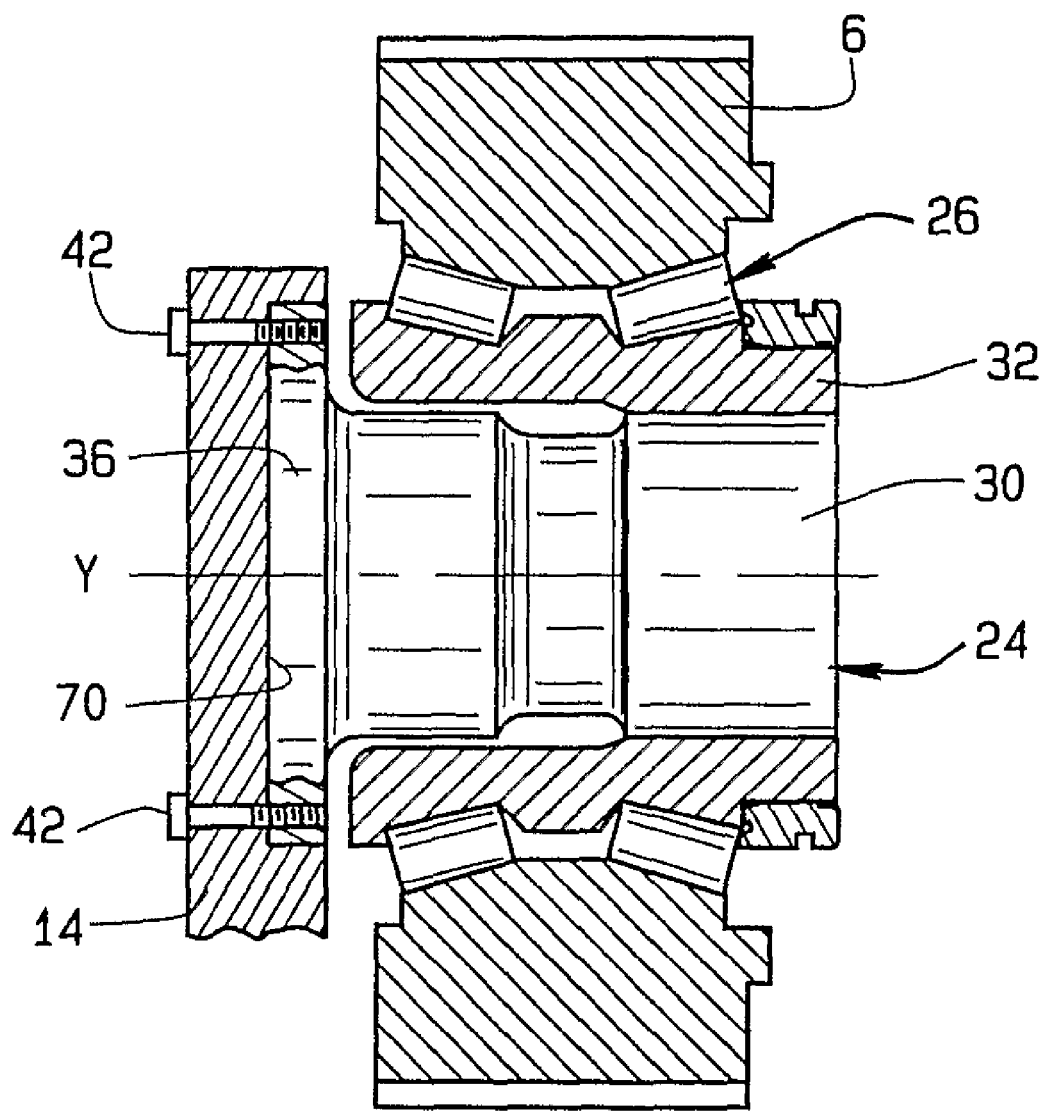
FIG. 5 is a sectional view of a planet gear and flexpin with a modified mounting.

The inner pin 30 of each flexpin 24 need not have a cylindrical boss 38 to position the flexpin 24 on its carrier wall 14 (FIG. 5). Where the inner pin 30 is configured without the boss 38, the carrier wall 14 is provided with a shallow socket 72 that receives the flange 36 of the inner pin 30 with a slight interference fit. Being shallow, the socket 72 has a bottom surface against which the flange 36 seats. The machine screws 42 extend into the socket 72 to thread into the flange 36.

The planet gears 6 with their flexpins 24 may be organized only in a single array between the sun and ring gears 2 and 4, in which event the carrier 8 need have only one carrier wall 14. Other types of bearings, such as needle bearings, spherical or cylindrical roller bearings, or angular contact ball bearings, or even simple plain bearings may be used to facilitate rotation between the planet gears 6 and the flexpins 24.

The invention claimed is:

1. An epicyclic gear system comprising;
a sun gear located along a central axis;
a ring gear located around the sun gear and centered with respect to the central axis;
planet gears located between and engaged with the sun and ring gears for rotation about offset axes; and
a carrier also centered with respect to the central axis, the carrier including a carrier wall and flexpins that project from the carrier wall into the planet gears along the offset axes for the planet gears, each flexpin having an inner pin provided with flange that projects radially outwardly with respect to the offset axis of its planet gear and overlies the carrier wall, with the inner pin at its flange being secured to the carrier wall with machine screws, so that the inner pin is cantilevered from the carrier wall, and a sleeve that encircles the inner pin and is cantilevered from the inner pin remote from the flange, so that the flexpin provides a double cantilever, the carrier also including a bearing located between the sleeve of each flexpin and the planet gear into which the flexpin projects.

2. An epicyclic gear system according to claim 1 wherein the machine screws extend through the carrier wall and thread into the flanges of the inner pins for the flexpins.

3. An epicyclic gear system according to claim 1 wherein the inner pin of each flexpin has a shank, with the flange being at the end of the shank, and a fillet where the shank and flange merge.

4. The epicyclic gear system of claim 1 coupled to a rotor of a wind turbine such that the gear system delivers torque at an angular velocity greater than the angular velocity of the rotor.

5. An epicyclic gear system according to claim 1 wherein the carrier wall is one of two carrier walls on the carrier, and the flexpins project from each carrier wall, with each flexpin projecting into one of the planet gears, whereby the flexpins and planet gears are organized in two arrays, with the flexpins in the one array being detached from the flexpins in the other array.

6. An epicyclic gear system according to claim 5 wherein the flexpins and planet gears of the one array are offset angularly with respect to the flexpins and planet gears of the other array, so that planet gears of the two arrays do not engage the same teeth on the sun and ring gears simultaneously.

7. An epicyclic gear system according to claim 5 wherein the teeth on the sun gear and the ring gear that are engaged by the planet gears of the one array are separated from the teeth that are engaged by the planet gears of the other array.

8. An epicyclic gear system comprising;
a sun gear located along a central axis;
a ring gear located around the sun gear and centered with respect to the central axis;
planet gears located between and engaged with the sun and ring gears for rotation about offset axes; and
a carrier also centered with respect to the central axis, the carrier including a carrier wall having sockets and flexpins that project from the carrier wall at the sockets and into the planet gears along the offset axes for the planet gears, each flexpin having an inner pin provided with flange that projects radially outwardly with respect to the offset axis of its planet gear and overlies the carrier wall, each inner pin also having a boss located behind its flange, the inner pin at its flange being attached to the carrier wall with its boss being in the socket for its flexpin, so that the inner pin is cantilevered from the carrier wall, and a sleeve that encircles the inner pin and is cantilevered from the inner pin remote from the flange, so that the flexpin provides a double cantilever, the carrier also including a bearing located between the sleeve of each flexpin and the planet gear into which the flexpin projects.

9. An epicyclic gear system according to claim 8 wherein the sockets and bosses are cylindrical, and the bosses fit into the sockets with interference fits.

10. An epicyclic gear system comprising;
a sun gear located along a central axis;
a ring gear located around the sun gear and centered with respect to the central axis;
planet gears located between and engaged with the sun and ring gears for rotation about offset axes; and
a carrier also centered with respect to the central axis, the carrier including a carrier wall having sockets provided with bottom surfaces and flexpins that project from the carrier wall at the sockets and into the planet gears along the offset axes for the planet gears, each flexpin having an inner pin provided with flange that projects radially outwardly with respect to the offset axis of its planet gear and fits into the socket for its flexpin where it seats against the bottom surface of the socket and overlies the carrier wall, with the inner pin at its flange being attached to the carrier wall so that the inner pin is cantilevered from the carrier wall, and a sleeve that encircles the inner pin and is cantilevered from the inner pin remote from the flange, so that the flexpin provides a double cantilever, the carrier also including a bearing located between the sleeve of each flexpin and the planet gear into which the flexpin projects.

* * * * *